(12) United States Patent
Hishinuma et al.

(10) Patent No.: US 6,467,309 B1
(45) Date of Patent: Oct. 22, 2002

(54) METHOD FOR MANUFACTURING A GLASS SHEET HAVING AN UNEVEN SURFACE

(75) Inventors: Akihiro Hishinuma; Toshiaki Hashimoto, both of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 119 days.

(21) Appl. No.: 09/584,512

(22) Filed: May 31, 2000

(30) Foreign Application Priority Data

May 31, 1999 (JP) ............................................ 11-152626

(51) Int. Cl.[7] .......................... C03B 13/00; C03B 18/02
(52) U.S. Cl. ........................ 65/99.2; 65/99.1; 65/99.5; 65/99.6; 65/182.1; 65/182.3; 65/60.53
(58) Field of Search .................. 65/60.53, 99.1, 65/99.2, 99.5, 99.6, 182.1, 182.3

(56) References Cited

U.S. PATENT DOCUMENTS

| 3,674,453 A | 7/1972 | Loukes et al. |
| 3,681,042 A | 8/1972 | Edwards et al. |
| 4,012,216 A | * 3/1977 | Marchand |
| 4,115,091 A | * 9/1978 | Bourggraff et al. |
| 4,746,347 A | 5/1988 | Sensi |

FOREIGN PATENT DOCUMENTS

| BE | 757557 | * 12/1970 | ................. 65/99.6 |
| LU | 61 456 A | 10/1970 | |

* cited by examiner

Primary Examiner—Michael Colaianni
(74) Attorney, Agent, or Firm—Merchant & Gould P.C.

(57) ABSTRACT

A heat-resistant pipe is arranged so as to traverse below a glass ribbon in a float bath of molten tin, and bubbles emanate from the heat-resistant pipe, thereby making the bottom surface (which is in contact with the tin) uneven. Alternatively, the bottom surface is made uneven with a roller for lifting the glass ribbon out of the float bath into an annealing furnace. In addition to these operations for making the glass surface uneven, a film can be applied to the top face of the glass ribbon (i.e. the surface that is not in contact with the tin) by CVD, supplying a mixed gas of raw material from coaters. Thus, the invention makes it possible to manufacture a glass sheet having an uneven surface efficiently, using a technique for processing the surface of a glass sheet that is suitable for a production line for float glass.

3 Claims, 5 Drawing Sheets

METHOD FOR MANUFACTURING A GLASS SHEET HAVING AN UNEVEN SURFACE

FIELD OF THE INVENTION

The present invention relates to a method for manufacturing a glass sheet having an uneven surface. The present invention also relates to a method for manufacturing a glass sheet having an uneven surface on one side, and a thin film formed on the other side.

BACKGROUND OF THE INVENTION

In the method for manufacturing glass sheets known as the "float method", first, raw glass material that has been melted in a tank furnace (float furnace) is transferred to a tin bath. When the molten glass material is transferred to the float bath, it spreads over the tin, whose specific weight is larger than that of the glass, and forms a glass ribbon. The thickness of the glass ribbon is adjusted while the glass ribbon advances inside the float bath, and it is cooled so that it has a viscosity with which it can be retrieved from the bath. The cooled glass ribbon is lifted out of the float bath and conveyed into an annealing lehr, where it is annealed, and subsequently cut into glass sheets of predetermined size. The float method is widely used for low-cost mass production of glass sheets having a pair of smooth and parallel surfaces.

One way of reducing reflections on the glass surface is to make the glass surface rough. Usually, such a glass sheet is obtained by physically or chemically processing the smooth surfaces achieved with the float method. A physical method is, for example, sand-blasting, whereas etching with hydrofluoric acid is one of the known chemical methods. These methods are typically applied to the glass sheet obtained by cutting the glass ribbon, and are usually performed in a production line that is separate from the glass sheet production line (i.e. as offline processing).

Aside from the float method, rolling out molten glass with a pair of (upper and lower) rollers is widely used as a method for manufacturing patterned glass sheets or wire glass sheets for buildings. In this manufacturing method, the pattern (i.e. the unevenness of the surface) of the patterned glass is formed by continuously transferring a pattern carved in one of the rollers, without necessitating offline processing.

As one of the manufacturing methods using rollers, JP 57-178514 B discloses a method of conveying a glass ribbon that has been rolled out with rollers over molten tin. In this method, the molten tin supports the rolled out glass sheet, so that the portions that locally have become thinner where a pattern has been formed do not droop below the other portions.

Thus, conventional methods for manufacturing glass sheets having an uneven surface include the method of rolling out the glass sheet with rollers and the method of offline processing glass sheets made with the float method. However, in the former method, there is a limit to the thickness of the glass sheet that can be produced. Moreover, because the surface is formed by rolling with rollers, it is not possible to make one surface uneven while maintaining a superior smoothness of the other surface. For the latter method, offline processing leads to the problem of a lower production efficiency.

SUMMARY OF THE INVENTION

It is therefore an object of the present invention to provide a method for efficiently manufacturing a glass sheet having an uneven surface, using a technique for processing the surface of a glass sheet that is suitable for a production line for float glass.

In order to achieve this object, a first inventive method for manufacturing a glass sheet with the float method by forming molten raw glass material on a metal bath into a glass ribbon includes making a surface of the glass ribbon facing the metal bath uneven by bringing the surface into contact with bubbles generated inside the metal bath.

In this first method, it is preferable that the bubbles are brought into contact with the glass ribbon where the viscosity of the glass ribbon is between $10^3$ and $10^6$ poise.

To achieve the above-noted object, a second inventive method for manufacturing a glass sheet with the float method by forming molten raw glass material on a metal bath into a glass ribbon includes making a surface of the glass ribbon facing the metal bath uneven by bringing the surface into contact with a roller arranged downstream from the metal bath in a conveyance direction of the glass ribbon.

In this second method, it is preferable that the surface is made uneven by contacting the roller with the glass ribbon where the viscosity of the glass ribbon is between $10^7$ and $10^{13}$ poise.

The present invention makes it possible to manufacture glass sheets having an uneven surface efficiently. Moreover, the even surface can have an excellent surface smoothness.

The present invention also provides a method for manufacturing a glass sheet having an uneven surface on one side and a thin film formed on the surface of the other side. This method can be easily integrated into a production line for float glass, and does not necessitate offline processing. More specifically, this method includes making the surface of the glass ribbon facing the metal bath in the first or the second method uneven, and forming a thin film on a surface of the glass ribbon facing away from the metal bath. There is no particular limitation to the order of making the surface uneven, and forming the thin film, as long as these operations are integrated into the same production line. Moreover, it is also possible to combine the first method and the second method to make the surface uneven.

DESCRIPTION OF THE PREFERRED EMBODIMENTS

The following is a description of the preferred embodiments, with reference to the accompanying drawings.

First Embodiment

Figure 1:
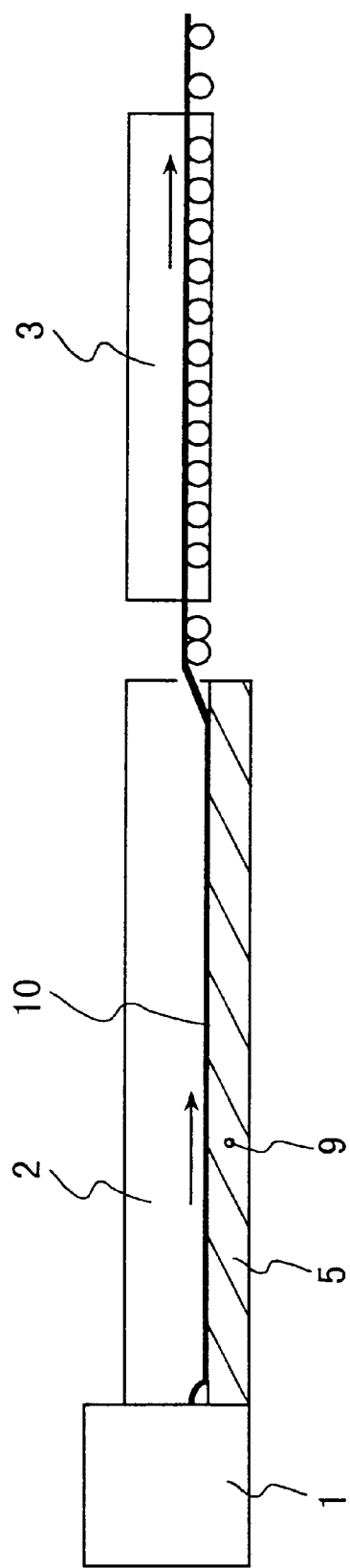
FIG. 1 shows an embodiment of an apparatus for the present invention.

FIG. 1 is a cross-sectional view of an example of an apparatus that can be used to embody the present invention. In this apparatus, as in a conventional glass manufacturing apparatus employing the float method, a furnace 1 in which the introduced raw glass material is melted, a float bath 2 for accepting the molten glass from the furnace and forming a glass ribbon of predetermined thickness, and an annealing furnace 3 for annealing the glass ribbon 10 drawn from the float bath are arranged one behind the other. Downstream in the glass ribbon conveyance direction, there is a glass ribbon cutter and a sheet handling apparatus, which are not shown in the drawings.

In this apparatus, a heat-resistant pipe 9 is immersed in the molten tin 5 of the float bath 2. This heat-resistant pipe 9 is immersed to supply the molten tin 5 with a gas or a gas generating source, and is arranged in the molten tin 5 so as to traverse below the glass ribbon 10. The heat-resistant pipe 9 is made of a material that is durable enough to withstand long periods of use in the molten tin 5. As long as it has this characteristic, there is no particular limitation on the material for the heat-resistant pipe, and examples of appropriate materials include (porous) alumina or zirconia bricks, carbon or alumina coated with a thin film. More specifically, a porous pipe of sintered alumina is appropriate for the heat-resistant pipe.

Figure 2:
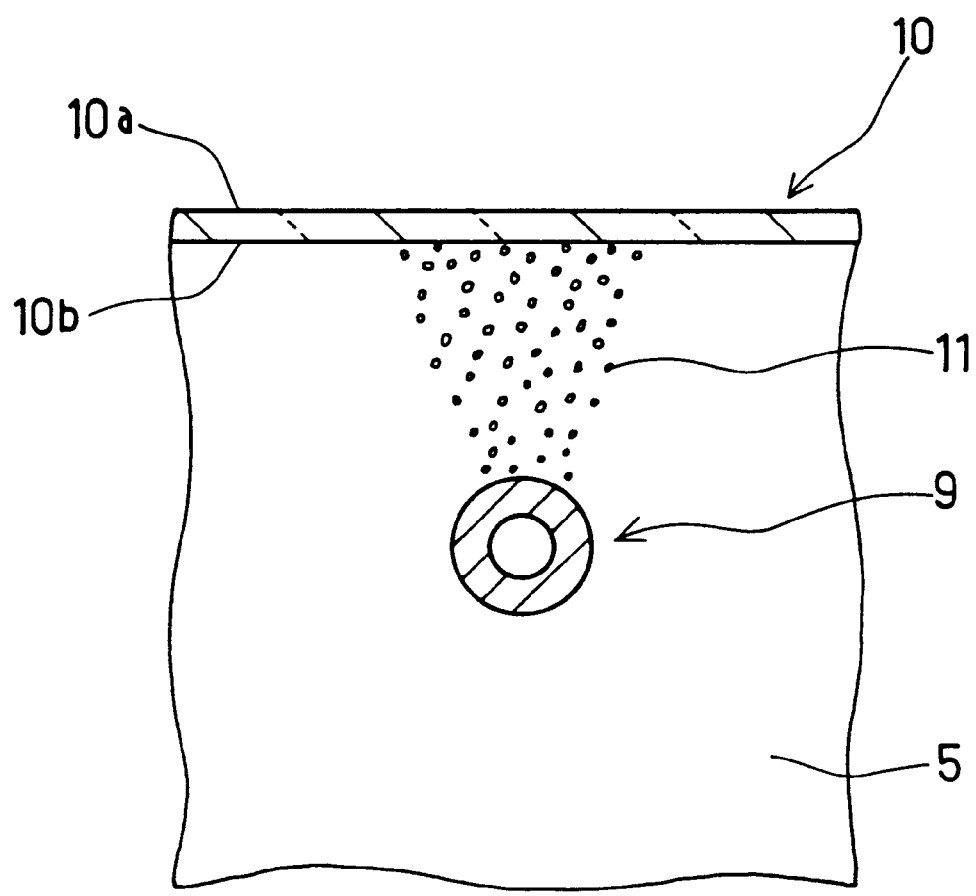
FIG. 2 is a partial magnification of the float bath in the apparatus shown in FIG. 1.

As is shown in FIG. 2, the heat-resistant pipe 9 is hollow, and a gas that is sent along this hollow portion emanates into the molten tin 5 through pores (not shown in the drawings) provided in the pipe wall. Once the gas has emanated into the molten tin, it forms bubbles 11 and rises through the molten tin until it reaches the face 10b of the glass ribbon 10 that is in contact with the molten tin (i.e. the bottom face). Thus, due to the contact with the gas bubbles 11, a slight unevenness is formed in the bottom face 10b. Because the glass ribbon is conveyed, this unevenness can be formed continuously on the bottom face 10b by generating bubbles at a predetermined location.

There is no particular limitation to the gas that is supplied to the heat-resistant pipe 9, but considering the fact that the float bath 2 is usually maintained under a nitrogen atmosphere containing small amounts of hydrogen, a non-oxidizing gas, for example, nitrogen, hydrogen or an inert gas such as helium or argon, is appropriate.

It is also possible to supply the molten tin with a material that turns into a gas when heated, or generates a gas by reaction with the tin. Examples of such materials include iron, silicon carbide and all sorts of refractory materials. It is preferable to support these materials, which can turn into gas sources, with one of the heat-resistant materials mentioned above when immersing them into the tin. A specific example for this method is to put iron pellets into a carbon basket and immerse them into the molten tin.

There is no particular limitation regarding the location of the heat-resistant pipe 9 in the molten tin 5, as long as the purpose of the present invention can be attained, but it is preferable that the heat-resistant pipe 9 is arranged at a location such that bubbles are supplied to the glass ribbon 10 where its viscosity is $10^3$ to $10^6$ poise.

In one specific example of an embodiment of the present invention, a porous alumina pipe with 20 mm outer diameter was arranged traversing the glass ribbon at a position where the viscosity of the glass ribbon was $10^{4.5}$ poise. Nitrogen gas was fed through this porous pipe at 50 cm$^3$/min, and when nitrogen bubbles of 1 μm to 1 mm size were generated in the molten tin, tiny convex and concave portions of about 0.1 μm to 2 mm diameter were formed continuously in the bottom face of the glass ribbon. In this example, the conveyance speed of the glass ribbon was about 7 m/min, and the thickness of the glass sheet was about 6 mm. On the other hand, the face 10a of the glass ribbon not contacting the molten tin (i.e. the top face) had a very high surface smoothness, as is the case without the bubbles.

One advantage of this embodiment is that the size and the shape of the convex and concave portions formed in the surface of the glass ribbon can be controlled easily. In this example, it is also easy to control the distribution of the unevenness by changing the flow amount of the nitrogen, for example. Moreover, the shape of the surface unevenness can be controlled with the location where bubbles are generated (i.e. the position of the heat-resistant pipe). It could be verified that by controlling these conditions, convex and concave portions with a diameter of 0.1 μm to 5 mm can be formed in the surface.

Second Embodiment

Figure 3:
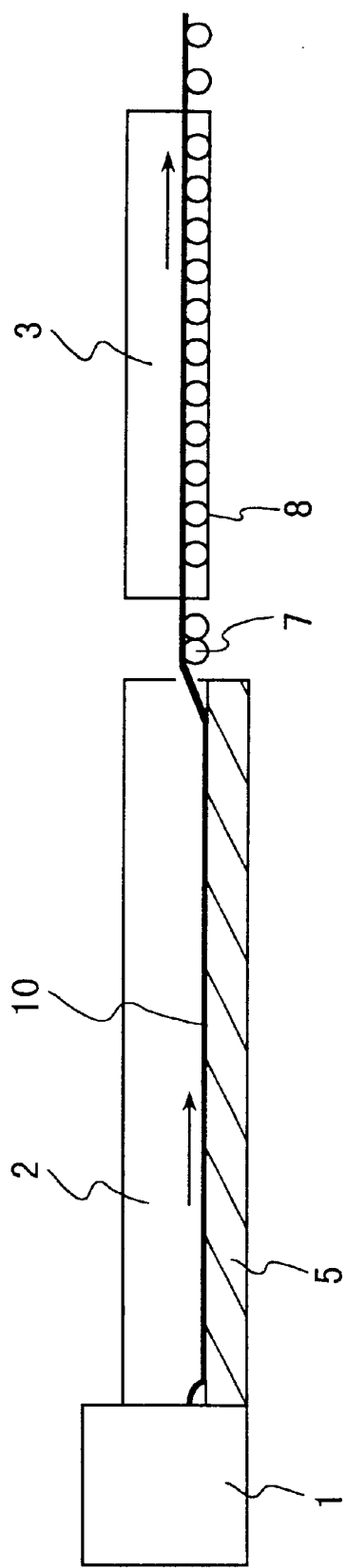
FIG. 3 shows another embodiment of an apparatus for the present invention.

FIG. 3 is a cross-sectional view of another example of an apparatus that can be used to embody the present invention. With regard to the arrangement of the furnace 1, the float bath 2, and the annealing furnace 3, this apparatus is identical to the one shown in FIG. 1. However, in this second embodiment, the unevenness in the bottom face 10b of the glass ribbon is not formed with bubbles in the float bath, but with a lift-out roller 7 for lifting the glass ribbon 10 out of the float bath 2.

Usually, uneven portions in the surface of the lift-out roller 7 are eliminated at all cost, so as to maintain the smoothness of the surface of the glass ribbon formed on the molten tin. In this embodiment, however, a predetermined pattern is carved into the surface of the lift-out roller 7, so as to apply a pattern of unevenness to the bottom face 10b of the glass ribbon.

In one specific example of this embodiment of the present invention, a lift-out roller 7 with a surface made of a ceramic coating, and having convex and concave portions with a diameter of the convex portions of 1 to 5 μm was used, and a glass ribbon of 6 mm thickness was conveyed from the float bath to the annealing furnace at a lifting speed about 7 m/min. As a result, convex and concave portions with a diameter of about 1 to 5 μm were formed in the bottom face of the glass ribbon. Also in this case, the top face 10a of the glass ribbon had a very high surface smoothness.

To form the unevenness, it is also possible to use the conveyance rollers (annealing rollers) 8 in the annealing furnace 3, for example, instead of the lift-out roller 7. Moreover, it is also possible to let the bottom face 10b of the glass ribbon slide against the roller surfaces by adjusting the rotation speed of the rollers, so that the necessary stress for forming an unevenness is exerted on the bottom face.

In order to make the bottom face uneven with rollers that are arranged downstream from the float bath, as in this embodiment, it is preferable that the contact of the rollers with the glass ribbon is established at a location where the glass ribbon has a viscosity of $10^7$ to $10^{13}$ poise.

Third Embodiment

Figure 4:
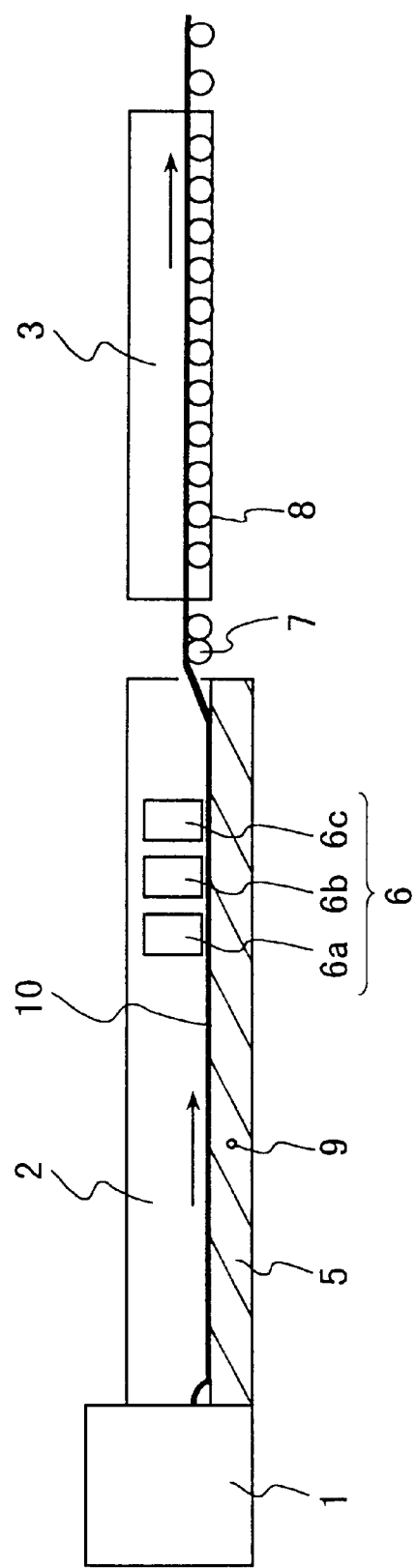
FIG. 4 shows yet another example of an apparatus for embodying the present invention.

FIG. 4 is a cross-sectional view of another example of an apparatus that can be used to embody the present invention. As with the apparatus shown in FIG. 1, this apparatus has a furnace 1, a float bath 2, and an annealing furnace 3 arranged one behind the other, and a heat-resistant pipe 9 is arranged in the molten tin of the float bath 2. Moreover, coaters 6 for forming a film on the top face 10a of the glass ribbon 10 by chemical vapor deposition (CVD) are arranged directly above the glass ribbon 10 in the float bath 2.

These coaters 6 supply a mixed gas as the raw material for forming this film, so that the film is formed continuously on the top face 10a of the glass ribbon. Moreover, as shown in the drawing, using a plurality of coaters 6a, 6b and 6c, it is possible to form a film including a plurality of continuous layers. On the other hand, a continuous unevenness is formed on the bottom face 10b, as has been explained for the first embodiment. As a result, with this embodiment it is possible to form a thin film on the top face 10a of the glass ribbon and an unevenness on the bottom face 10b with a glass sheet production line employing the float method.

In an example of this embodiment of the present invention, using the apparatus shown in FIG. 4, a slight unevenness was applied to the bottom face of the glass ribbon as in the first embodiment of the present invention, and a stannic oxide ($SnO_2$) film, a silicon oxide ($SiO_2$) film, and a stannic oxide film including fluorine ($SnO_2$:F) were formed in this order on the top face of the glass ribbon. This film forming method is explained in the following. First of all, a mixed gas of dimethyl tin dichloride (vapor), oxygen, helium and nitrogen is supplied from a first coater (denoted by numeral 6a in FIG. 4) located at the furthest upstream position, and a stannic oxide film of about 30 nm thickness is formed on the glass ribbon. Then, a mixed gas of silane (monosilane), ethylene, oxygen and nitrogen is supplied from a second coater (denoted by numeral 6b in FIG. 4), and a silicon oxide film of about 30 nm thickness is formed on the stannic oxide film. Then, a mixed gas of dimethyl tin dichloride (vapor), oxygen, hydrogen, nitrogen and fluorine is supplied from a third coater (denoted by numeral 6c in FIG. 4), and a fluorine-including stannic oxide film of about 720 nm thickness is formed on the silicon oxide film. After annealing the glass ribbon, it is cut into pieces of a predetermined size.

Figure 5:
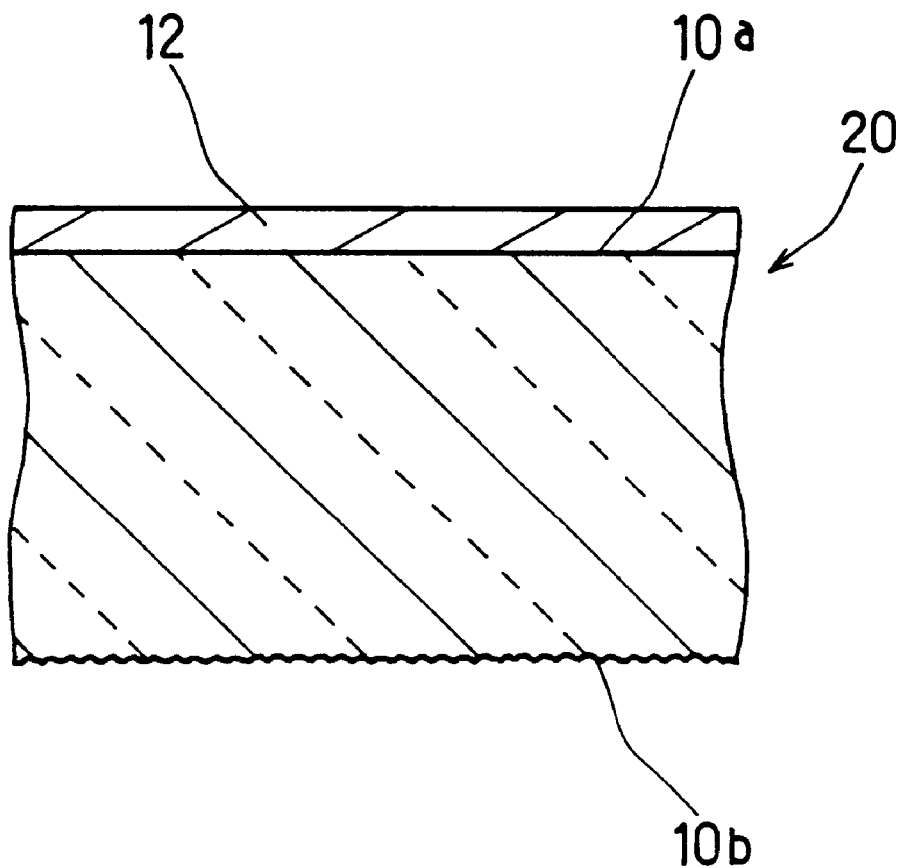
FIG. 5 is a cross-sectional view of a glass sheet with a film manufactured with an embodiment of the present invention.

As shown in FIG. 5, the resulting glass sheet 20 has a film 12 formed on its smooth top face 10a, and the bottom face 10b is slightly uneven. Forming a photovoltaic layer (for example an amorphous silicon film) and a metal film (rear electrode) on the fluorine-containing stannic oxide film (transparent conductive film), the thus obtained glass sheet with film can be used as the substrate for a thin-film solar cell. In this case, light entering the photovoltaic layer can be gathered from the bottom face 10b of the glass sheet. In this example, the amount of light entering the photovoltaic layer is increased, because the bottom face 10b is slightly uneven, which has an anti-reflective effect.

The above explanations related to the case that a glass sheet with a film suitable as a thin-film solar cell substrate is manufactured, but the films that can be formed with this embodiment are neither restricted with regard to their number of film layers nor with regard to the nature thereof. For example, forming a heat-reflecting film, and arranging the bottom face with the unevenness towards the inside of a room, the glass sheet can be used as window glass for buildings, and serve as heat-reflecting glass that curbs the reflection of light from the inside. Moreover, if a transparent conductive film is formed on the glass sheet, and the glass sheet is used as a transparent substrate for a flat display (e.g. a liquid crystal display) using this film as a transparent electrode, then the display becomes easier to watch, because the bottom face with the unevenness is anti-reflective.

Moreover, in the above-noted example, CVD was used, but the film formation is not limited to this method, and it is also possible to spray a solution or a powder for forming the film onto the top face of the glass ribbon. For the film formation, it is preferable to use a pyrolytic method for the raw material for forming the film, which utilizes the heat of the glass ribbon, such as CVD or spraying. Moreover, in the above-noted example, the bottom face was made uneven with bubbles generated in the molten tin, but it is equally possible to make the top face of a glass ribbon 10 on which a thin film has been formed in the float bath 2 uneven as well, using a lift-out roller 7 and a rear roll 8 arranged outside of the bath as in the second embodiment.

Moreover, the glass sheet obtained with the present invention itself can also be used as an anti-reflection and/or anti-glare glass sheet, without forming a thin film. Furthermore, it can be used as window glass that is translucent but not transparent, such as patterned glass.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes that come within the meaning and range of equivalency of the claims are intended to be embraced therein.

What is claimed is:

1. A method for manufacturing a glass sheet with the float glass method by forming molten raw glass material on a metal bath into a glass ribbon, the method comprising:

making a surface of the glass ribbon facing the metal bath uneven by bringing said surface into contact with gas bubbles generated in the metal bath.

2. The method of claim 1, wherein the gas bubbles are brought into contact with the glass ribbon at a location on the metal bath where the viscosity of the glass ribbon is between $10^3$ and $10^6$ poise.

3. The method of claim 1, comprising:

making the surface of the glass ribbon facing the metal bath uneven; and forming a thin film on a surface of the glass ribbon facing away from the metal bath.

* * * * *